Inventor
Thomas H. Riza
By John N. Randolph
Attorney

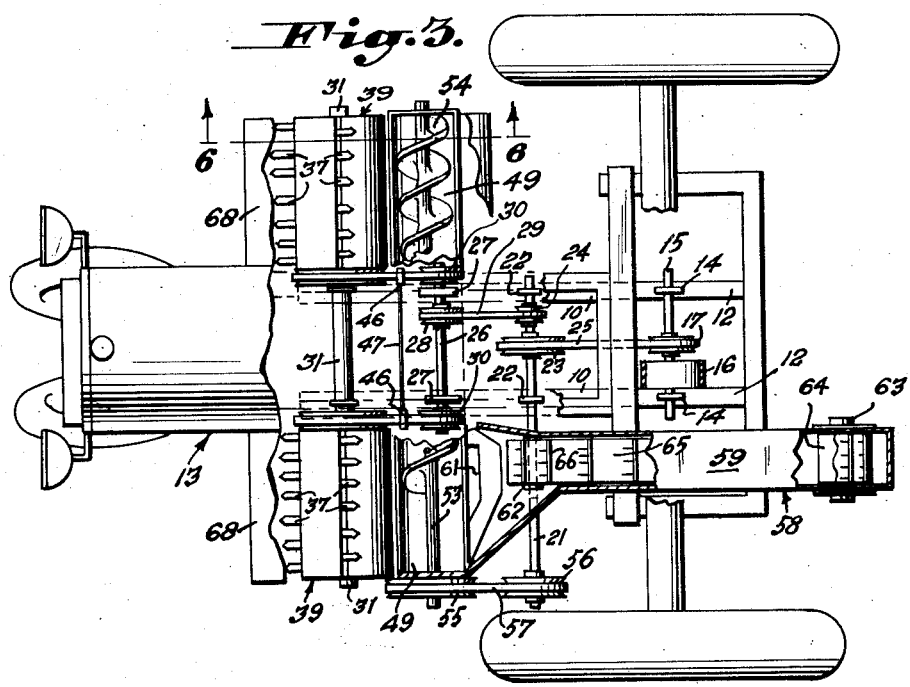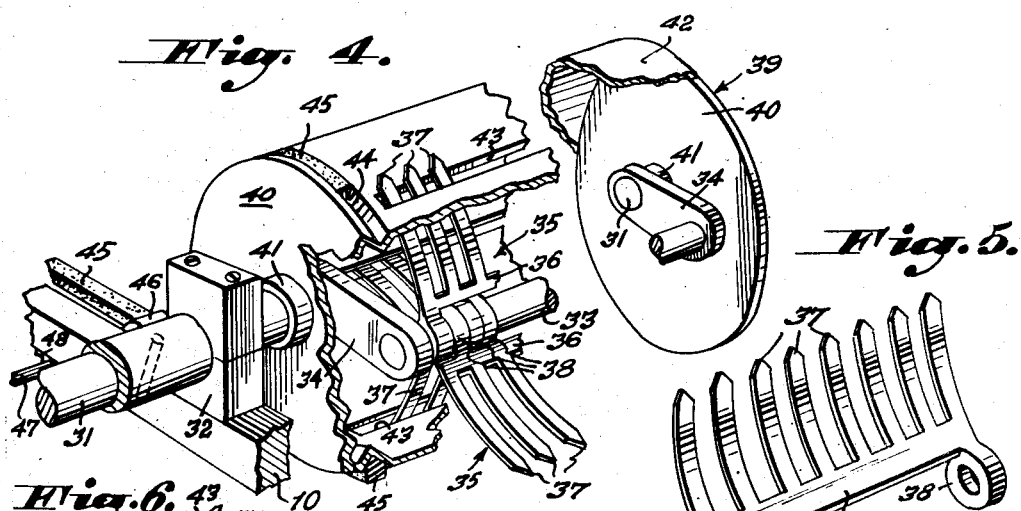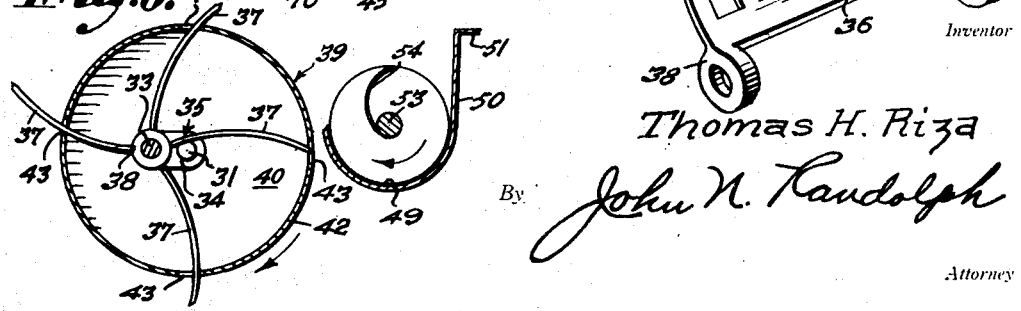

Patented Sept. 15, 1953

2,651,903

UNITED STATES PATENT OFFICE 2,651,903

COTTON STRIPPING MACHINE

Thomas H. Riza, Cleburne, Tex., assignor to Florene Stokes, Dallas, Tex.

Application April 21, 1950, Serial No. 157,323

3 Claims. (Cl. 56—11)

This invention relates to a novel machine of extremely simple construction which is adapted to be supported on and driven by a conventional farm tractor for stripping cotton from rows of cotton plants as the tractor, supporting the machine traverses a cotton field and which is capable of simultaneously stripping the cotton from two plant rows disposed at different distances apart.

More particularly, it is an object of the present invention to provide a cotton stripping machine having stripping elements which are mounted to rotate in conjunction with a drum or casing by means of which the cotton after being stripped from the plants by the stripping elements will be ejected from said stripping elements into a conveyor by the eccentric mounting of the stripping elements relatively to the drum or casing.

Still a further object of the invention is to provide a cotton stripper wherein the stripping elements are spaced sufficiently apart so that trash may readily fall between the individual elements and escape therefrom yet which are disposed sufficiently close together to prevent cotton thus escaping therefrom.

Still a further object of the invention is to provide a cotton stripping machine forming an attachment for a tractor having a trough for receiving the cotton which is ejected from the stripping elements and provided with means for conveying the cotton to an elevator forming a part of the machine and by which the cotton is conveyed and delivered to a trailer or other means for hauling the picked cotton.

A further object of the invention is to provide a machine which is so constructed that it may be readily mounted on and supported solely by a conventional farm tractor and connected to and operatively driven from a power take-off shaft thereof so that the machine does not require a separate drive or any ground engaging wheels or other supporting elements.

Still a further object of the invention is to provide a machine which is partially divided into laterally spaced sections which are disposed on opposite sides of the chassis of the tractor positioned to pass along rows of cotton between which the tractor chassis is disposed.

Various other objects and advantages of the invention will hereinafter become more fully apparent from the following description of the drawings, illustrating a presently preferred embodiment of the cotton stripping machine and wherein:

Figure 3 is a top plan view of the same with a portion of the tractor broken away and a part of the machine shown in horizontal section to illustrate details thereof;

Figure 4 is an enlarged fragmentary perspective view of one of the cotton stripping units;

Figure 5 is a perspective view on an enlarged scale of one set of cotton stripping elements, shown removed from the machine, and Figure 6 is a sectional view on an enlarged scale through one of the cotton stripping units and the cotton conveyor, taken substantially along a plane as indicated by the line 6—6 of Figure 3.

Figure 1:
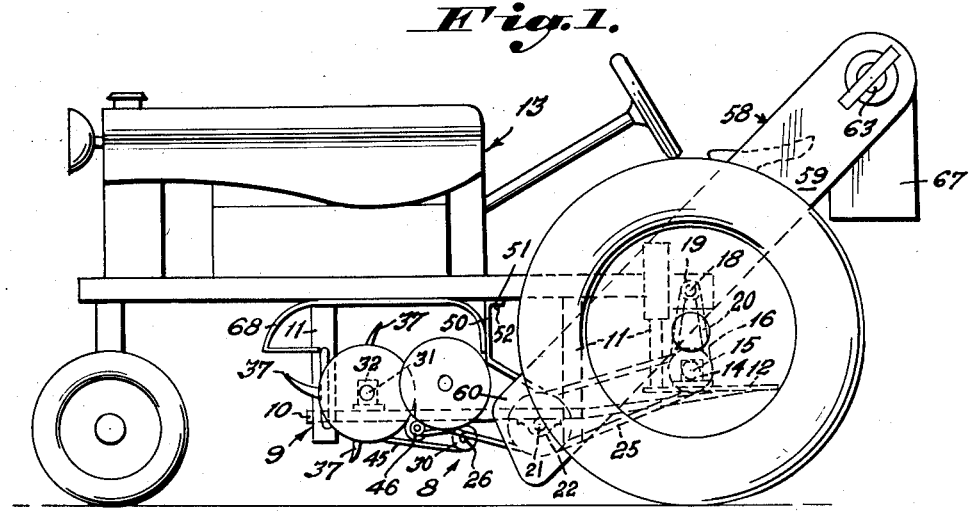
Figure 1 is a side elevational view showing the machine mounted on a conventional farm tractor.
Figure 2:
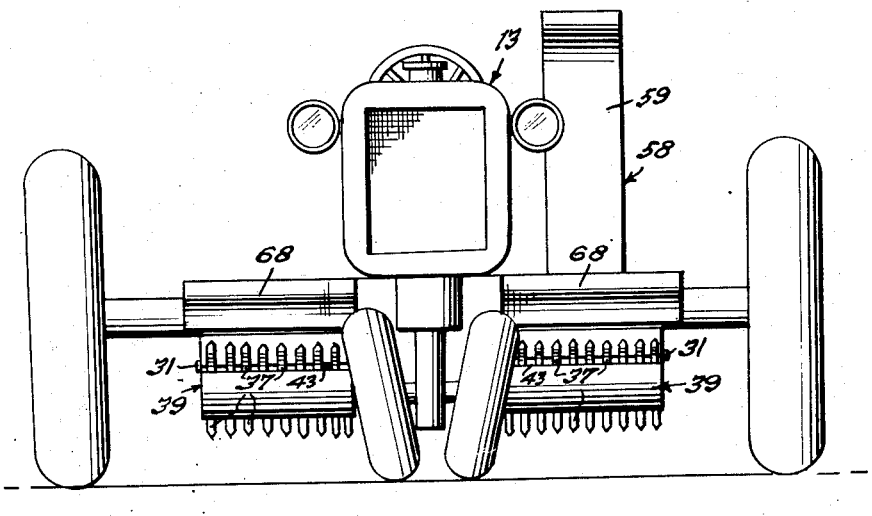
Figure 2 is a front elevational view thereof looking from left to right of Figure 1.

Referring more specifically to the drawings, the cotton stripping machine in its entirety is designated generally 8 and includes a supporting frame, designated generally 9 comprising laterally spaced, longitudinally extending beams 10, supporting hangers 11 and secondary, longitudinally extending beams 12. The hangers 11 are secured to and depend from the sides of the chassis of a conventional farm tractor, designated generally 13 for supporting the frame 9 therebeneath with the beams 10 extending longitudinally of the tractor from between its rear wheels to a point behind but adjacent the tractor front wheels. The two rearmost hangers 11, as seen in dotted lines in Figure 1, support the forward ends of the secondary beams 12 which are secured at their rear ends to the rear ends of the beams 10. The secondary beams 12 support upstanding, transversely aligned bearings 14 in which is journalled a first countershaft 15 having fixed thereto two belt pulleys 16 and 17. The tractor 13 is provided with a power take-off shaft 18 which is disposed above the countershaft 15 and which is provided with a belt pulley 19, located over the belt pulley 16 and connected thereto by an endless belt 20 so that the shaft 15 is driven from the tractor power take-off shaft 18 and in a clockwise direction, as seen in Figure 1.

The cotton stripping machine 8 is provided with a second countershaft 21 which is journalled adjacent one end thereof in bearings 22 which depend from the beams 10. The second countershaft 21 is disposed forwardly of the countershaft 15 and has one end extending laterally beyond one side of the chassis of the tractor 13, as best illustrated in Figure 3. Two belt pulleys 23 and 24 are fixed to the shaft 21, between the bearings 22 and an endless belt 25 connects the belt pulleys 17 and 23 for driving the countershaft 21 from the countershaft 15. A third, shorter countershaft 26 is disposed beneath the tractor chassis and journalled in bearings 27 which depends from the beams 10 and is provided with a belt pulley 28, located between the bearings 27, which is connected to the belt pulley 24 by an endless belt 29. The shaft 26 is provided with a belt pulley 30 fixed to each end thereof and which belt pulleys are located outwardly of the bearings 27.

A rod 31 extends transversely of the frame 9, adjacent the forward end of the machine 8 and is secured in clamping members 32 which rise from the beams 10 to non-rotatably support the rod 31. Outwardly of each side of the frame 9, the rod 31 is provided with a forwardly offset portion 33, which portions are connected to the remainder of the rod 31 by arms 34 which extend longitudinally of the machine 8. On each rod portion 33 is rotatably mounted a plurality, preferably four sets of cotton stripping elements, each designed generally 35. The cotton stripping elements 35 are each in the form of a comb including a longitudinally extending head or bar 36, a plurality of tines or fingers 37 and a pair of journal eyes 38. The tines or fingers 37 project transversely from one longitudinal edge of the bar or head 36 and are longitudinally bowed all in the same direction. The journal eyes 38 project from the opposite longitudinal edge of the bar 36. The different sets of cotton stripping elements 35 which are mounted on each rod 33 differ from one another only in that the journal eyes 38 are spaced differently with respect to the ends of the bars 36 so that the two journal eyes of each set of cotton picking elements 35 may be journalled on its rod portion 33 and with the different sets of cotton stripping elements 35 disposed in radial alignment, by arranging said journal eyes 38 of the different stripping elements 35 in staggered relationship, as clearly illustrated in Figure 4. The spacing between the tines or fingers 37 of each stripping element 35 may vary, preferably being between five-eighths of an inch and one inch.

A drum 39 is disposed around each forwardly offset shaft portion 33 and partially around the sets of strippers 35 mounted thereon, each drum 39 having corresponding end walls 40 provided with central bearings 41 which are journalled on the stationary shaft 31 beyond and adjacent the pair of arms 34 which supports the offset shaft portion 33, inclosed by each drum 39. A cylindrical wall 42 of each drum 39 is provided with a plurality of longitudinally extending slots 43 which extend to adjacent the ends thereof and which are equally spaced from one another circumferentially of the drum. The number of slots 43 correspond to the number of sets of stripping elements 35 which are journalled on each shaft portion 33 and the tines or fingers 37 of each stripping element extend through one of the slots 43. The drums 39, at their adjacent ends are each provided with a groove extending around its cylindrical portion 42 which is preferably V-shaped in cross section to provide a belt pulley 44 and which is disposed between the inner end wall 40 of said drum and the adjacent ends of its slots 43.

An endless belt 45 is trained around each pulley groove 44 and around the belt pulley 30 which is disposed behind and in alignment therewith. The upper flight of each belt 44 is trained under an idler pulley 46 which is disposed substantially beneath the rearmost peripheral portion of the adjacent drum 39. The idler pulleys 46 are mounted on a shaft 47 which is journalled in bearings 48, secured to the beams 10, as seen in Figure 4.

A trough 49 extends transversely of the machine 8 and is disposed behind and adjacent the drums 39 and extends to or beyond the remote ends of said drums. The front edge of the trough 49, defining the forward part of the open top thereof terminates at approximately the level of the center of the drums 39 but the rear wall 50 of the trough is extended upwardly and terminates in an outturned flange 51 which is secured by fastenings 52 to the underside of the chassis of the tractor 13. The intermediate portion of the bottom of the trough preferably rests upon and may be secured to the beams 10. A shaft 53 extends longitudinally through the trough 49 and is journalled adjacent its ends in the end walls thereof and has a screw conveyor 54 fixed thereto and which operates in the trough 49. A belt pulley 55 is fixed to one end of the shaft 53, beyond an end of the trough 49 and in longitudinal alignment with a belt pulley 56 which is fixed to the laterally extending end of the shaft 21. An endless belt 57 is trained over the belt pulleys 55 and 56.

An elevator, designated generally 58 includes an inclined housing or casing 59 which is disposed on the same side of the tractor chassis as the laterally extending end of the shaft 21 and which is supported by a laterally extending portion 12a of the frame 9. The elevator casing 59 has an enlarged lower, forward end 60 which is connected to the rear wall 50 of the trough 49 and said rear wall and the trough bottom are provided with an opening 61 which opens into the enlarged end 60 of the casing. The shaft 21 extends through and is journalled in the casing end 60 and has a roller or wide belt pulley 62 fixed thereto within the casing 59. A shaft 63 is journalled in the upper rear end of the casing 59 and has an idler belt pulley or roller 64 journalled thereon. An endless belt conveyor 65 is trained over the belt pulleys 62 and 64 and driven by the shaft 21 and is preferably provided on its outer side with longitudinally spaced, laterally extending slats 66. The upper end of the casing 59, beneath the belt pulley 64 is provided with a depending outlet or spout 67.

From the foregoing it will be readily apparent that when the tractor power take-off shaft 18 is revolved clockwise, as seen in Figure 1, the countershafts 15, 21 and 26 will be revolved in the same direction by the belt and pulley drive between the power take-off shaft 18 and the first countershaft 15 and the belt and pulley drive between the first and second countershafts 15 and 21, respectively, and the belt and pulley drive between the countershafts 21 and 26, as previously described. This will cause the upper flight of the conveyor belt 65 of the elevator 58 to move upwardly and rearwardly and will likewise cause the shaft 53 to turn the screw 54 in a direction for feeding cotton in the trough 49 from right to left of said trough, looking from rear toward the front of the machine, or toward the trough outlet 61. The belt drives 45 will also cause the drums 39 to be revolved clockwise as seen in Figure 1 and the idler pulleys 46 will cause the upper flights of the belts 45 to pass through the space between the peripheries of the drums 39 and the forward edge of the trough 49, as seen in Figures 3 and 6. As clearly illustrated in Figures 4 and 6, the cotton stripping elements 35 are eccentrically pivoted relatively to the axis of the drums 39 as defined by the rod or shaft 31 on which said drums revolve and as the tines 37 are at all times in engagement with the slots 43, the four stripping elements 35 which are mounted in each drum 39 will be revolved with said drum but on the forwardly offset shaft portion 33 as an axis. Accordingly, as each set of fingers 37 are turned from a depending position toward a forwardly extending position, the fingers will be projected outwardly through the slots 43 which they loosely engage and as the fingers pass a forwardly extending, substantially horizontal position and move toward an upwardly extending position, said fingers will begin to be retracted inwardly through the slots 43 due to their eccentric mounting relatively to the axis of the drums 39 and will continue to be drawn inwardly as the slot 43 which engages said set of fingers 37 moves downwardly and rearwardly toward the trough 49 so that when said slot 43 approaches a position adjacent the forward edge of the trough 49, the outer ends of the fingers 37 will be retracted into or substantially into the slots 43. Thereafter and as the fingers 37 with said slots 43 move downwardly and toward a bottommost position, the fingers will begin to move outwardly through the slots 43, all as clearly illustrated in Figure 6. The tractor 13 supporting the machine 8 is propelled by its prime mover through a cotton field parallel to the rows of cotton plants, not shown, so that the narrow gauge front wheels of the tractor 13 will move between two adjacent rows of plants and the wide gauge rear wheels will straddle said rows while the two drums 39 and the cotton stripping elements 35, mounted therein, will move along in alignment with the rows. Accordingly, each set of fingers or tines 37 in traveling upwardly from a lowermost position, as previously described, will engage and strip the cotton from the plants or rows along which the associated drum 39 of said fingers 37 is moving and after passing substantially a horizontal position and in which the fingers 37 are extending forwardly from the drum 39, said fingers will begin to be retracted and after passing an upright position will be drawn sufficiently into the drum 39 so that the cotton bolls will be disengaged from the fingers or tines 37 and thrown downwardly and rearwardly by centrifugal force from the drums 39 into the trough 49. The rear wall 50 of the trough 49 prevents the cotton from being thrown over the trough and the machine 8 is preferably provided with a hood 68 located over each drum 39 to prevent the cotton from being thrown upwardly. The hoods 68 are preferably supported at their inner ends by being secured to the front hangers 11 and at their rear ends or edges by engagement with the rear trough wall 50. After the cotton is thus stripped from the standing plants and delivered into the trough 49 it is conveyed from right to left of the machine 8, looking from the rear toward the front of the tractor 13, or toward the trough outlet 61. The cotton bolls pass outwardly through the outlet 61 into the elevator casing end 60 and onto the upper flight of the endless conveyor 65, on which the cotton is held by the slats 66 and conveyed upwardly and rearwardly of the elevator casing 59 to be discharged by gravity and centrifugal force from the endless conveyor 65 as it passes over the upper idler roller or pulley 64. The cotton thus discharged from the endless conveyor 65 falls through the elevator outlet or chute 67 into any suitable trailer vehicle, not shown, which may be attached to and drawn behind the tractor 13. The width of the drums 39 permits the machine 8 to be utilized with the tractor 13 for picking cotton from adjacent cotton rows which are spaced different distances apart. The fingers or tines 37 are bowed so as to extend upwardly when in forwardly projecting positions sufficiently to hold the cotton thereon and said fingers are spaced sufficiently apart to allow trash and other foreign matter to escape between the fingers.

Various modifications and changes are contemplated and may obviously be resorted to, without departing from the spirit or scope of the invention as hereinafter defined by the appended claims.

I claim as my invention:

1. In a cotton harvester, a stationary shaft, said shaft having an eccentric portion adjacent each end thereof, a plurality of cotton stripping elements swingably mounted on each of said eccentric shaft portions and each including a bar having longitudinally spaced aligned journal eyes disposed in offset relationship to one longitudinal edge of the bar and journaled on said eccentric shaft portion and a plurality of longitudinally spaced tines extending laterally from the opposite longitudinal edge of the bar, a pair of drums supported by the shaft, each drum enclosing one of said eccentric shaft portions and being journaled on portions of the stationary shaft disposed beyond the ends of said eccentric shaft portion, and driving means connected to each drum for revolving the drums on the shaft, each drum having longitudinally extending slots each slidably engaging the tines of one of the cotton stripping elements mounted on the eccentric shaft portion enclosed by said drum whereby the cotton stripping elements will be revolved with the drum and eccentrically thereof so that the tines will be projected and retracted relatively to the periphery of the drum through said slots during each revolution of the drum.

2. A cotton harvester as in claim 1, and supporting means rigidly secured to the shaft intermediate of its ends and between the eccentric shaft portions and the drums.

3. The combination with a tractor including a tractor chassis, of a cotton harvester attachment mounted on the tractor and suspended beneath the chassis comprising a frame connected to and supported beneath the chassis and disposed intermediate of its ends, a stationary shaft having an intermediate portion secured to said frame and supported thereby transversely of the tractor and intermediate of the ends of the tractor, said shaft including end portions projecting laterally from the frame and chassis and each including an eccentric portion, said shaft being nonrotatably secured to the frame, a plurality of cotton stripping elements swingably mounted on each of said eccentric shaft portions and each including a bar having longitudinally spaced aligned journal eyes disposed in offset relationship to one longitudinal edge of the bar and journalled on said eccentric shaft portion and a plurality of longitudinally spaced tines extending laterally from the opposite longitudinal edge of the bar, a pair of drums supported by the shaft, each drum enclosing one of said eccentric shaft portions and being journalled on portions of the stationary shaft disposed beyond the ends of said eccentric shaft portion, and driving means connected to each drum for revolving the drum on the shaft, each drum having longitudinally extending slots in each of which the tines of one of the cotton stripping elements are slidably engaged whereby the cotton stripping elements mounted on each eccentric shaft portion will be revolved with the drum enclosing said eccentric shaft portion, said cotton stripping elements being swingably mounted on the eccentric shaft portion eccentrically with respect to the axis of rotation of the drum so that the tines are projected and retracted relatively to the periphery of the drum through said slots during each revolution of the drum.

THOMAS H. RIZA.

References Cited in the file of this patent

UNITED STATES PATENTS

| Number | Name | Date |
|---|---|---|
| 150,661 | Lewis | Mar. 5, 1874 |
| 889,968 | Rickey | June 9, 1908 |
| 1,638,867 | Melton | Aug. 16, 1927 |
| 2,231,354 | Wilcox | Feb. 11, 1941 |
| 2,233,253 | Cory | Feb. 25, 1941 |
| 2,515,660 | Nichols | July 18, 1950 |